United States Patent
Kolar et al.

(10) Patent No.: US 7,221,927 B2
(45) Date of Patent: May 22, 2007

(54) STATION MOBILITY BETWEEN ACCESS POINTS

(75) Inventors: Tim Kolar, San Jose, CA (US); Edward S. Harriman, Jr., Saratoga, CA (US); Stan Chesnutt, Berkeley, CA (US); Allan Thomson, Pleasanton, CA (US); Dan Harkins, La Selva Beach, CA (US)

(73) Assignee: Trapeze Networks, Inc., Pleasanton, CA (US)

( * ) Notice: Subject to any disclaimer, the term of this patent is extended or adjusted under 35 U.S.C. 154(b) by 554 days.

(21) Appl. No.: 10/778,901

(22) Filed: Feb. 13, 2004

(65) Prior Publication Data

US 2005/0180358 A1  Aug. 18, 2005

(51) Int. Cl.
*H04M 1/00* (2006.01)
*H04Q 7/20* (2006.01)

(52) U.S. Cl. .............. 455/403; 455/556.1; 455/557; 370/331; 370/360; 370/252; 709/227; 709/245; 709/249

(58) Field of Classification Search ............... 455/445, 455/414.1, 426, 451.1, 458, 560.1, 422, 557, 455/556.1; 370/331, 360, 252; 709/227, 709/245, 249
See application file for complete search history.

(56) References Cited

U.S. PATENT DOCUMENTS

| | | | |
|---|---|---|---|
| 3,641,433 A | 2/1972 | Mifflin et al. | |
| 4,168,400 A | 9/1979 | De Couasnon et al. | |
| 4,176,316 A | 11/1979 | DeRoas et al. | |
| 4,247,908 A | 1/1981 | Lockart et al. | |
| 4,291,401 A | 9/1981 | Bachmann | |
| 4,291,409 A | 9/1981 | Weinberg et al. | |
| 4,409,470 A | 10/1983 | Shepard et al. | |
| 4,460,120 A | 7/1984 | Shepard et al. | |
| 4,475,208 A | 10/1984 | Ricketts | |
| 4,494,238 A | 1/1985 | Groth, Jr. | |
| 4,500,987 A | 2/1985 | Hasegawa | |
| 4,503,533 A | 3/1985 | Tobagi et al. | |
| 4,550,414 A | 10/1985 | Guinon et al. | |
| 4,562,415 A | 12/1985 | McBiles | |
| 4,630,264 A | 12/1986 | Wah | |
| 4,635,221 A | 1/1987 | Kerr | |
| 4,639,914 A | 1/1987 | Winters | |
| 4,644,523 A | 2/1987 | Horwitz | |
| 4,672,658 A | 6/1987 | Kavehrad | |

(Continued)

FOREIGN PATENT DOCUMENTS

WO    WO94/003986    2/1994

(Continued)

OTHER PUBLICATIONS

Acampora and Winters, IEEE Communications Magazine, 25(8):11-20 (1987).

(Continued)

*Primary Examiner*—Tony T. Nguyen
(74) *Attorney, Agent, or Firm*—Perkins Coie LLP

(57) ABSTRACT

Various embodiments are discussed for approaches to transparent mobility, which attempts to permit a wireless station to be handed off between wireless access points without packet loss, without noticeable delay to the station user, and/or without loss of session continuity.

28 Claims, 11 Drawing Sheets

U.S. PATENT DOCUMENTS

| | | | |
|---|---|---|---|
| 4,673,805 A | 6/1987 | Shepard et al. | |
| 4,707,839 A | 11/1987 | Andren et al. | |
| 4,730,340 A | 3/1988 | Frazier | |
| 4,736,095 A | 4/1988 | Shepard et al. | |
| 4,740,792 A | 4/1988 | Sagey et al. | |
| 4,758,717 A | 7/1988 | Shepard et al. | |
| 4,760,586 A | 7/1988 | Takeda | |
| 4,789,983 A | 12/1988 | Acampora et al. | |
| 4,829,540 A | 5/1989 | Waggener et al. | |
| 4,850,009 A | 7/1989 | Zook et al. | |
| 4,872,182 A | 10/1989 | Mcrae et al. | |
| 4,894,842 A | 1/1990 | Brockhaven et al. | |
| 4,901,307 A | 2/1990 | Gilhousen et al. | |
| 4,933,952 A | 6/1990 | Albrieux et al. | |
| 4,933,953 A | 6/1990 | Yagi | |
| 4,995,053 A | 2/1991 | Simpson et al. | |
| 5,008,899 A | 4/1991 | Yamamoto | |
| 5,029,183 A | 7/1991 | Tymes | |
| 5,103,459 A | 4/1992 | Gilhousen et al. | |
| 5,103,461 A | 4/1992 | Tymes | |
| 5,109,390 A | 4/1992 | Gilhousen et al. | |
| 5,142,550 A | 8/1992 | Tymes | |
| 5,151,919 A | 9/1992 | Dent | |
| 5,157,687 A | 10/1992 | Tymes | |
| 5,187,675 A | 2/1993 | Dent et al. | |
| 5,231,633 A | 7/1993 | Hluchyj et al. | |
| 5,280,498 A | 1/1994 | Tymes et al. | |
| 5,285,494 A | 2/1994 | Sprecher et al. | |
| 5,329,531 A | 7/1994 | Diepstraten | |
| 5,418,812 A | 5/1995 | Reyes et al. | |
| 5,448,569 A | 9/1995 | Huang et al. | |
| 5,450,615 A | 9/1995 | Fortune et al. | |
| 5,465,401 A | 11/1995 | Thompson | |
| 5,479,441 A | 12/1995 | Tymes et al. | |
| 5,483,676 A | 1/1996 | Mahany et al. | |
| 5,491,644 A | 2/1996 | Pickering et al. | |
| 5,517,495 A | 5/1996 | Lund | |
| 5,519,762 A | 5/1996 | Bartlett | |
| 5,528,621 A | 6/1996 | Heiman et al. | |
| 5,561,841 A | 10/1996 | Markus | |
| 5,568,513 A | 10/1996 | Croft et al. | |
| 5,584,048 A | 12/1996 | Wieczorek | |
| 5,598,532 A | 1/1997 | Liron | |
| 5,630,207 A | 5/1997 | Gitlin et al. | |
| 5,640,414 A | 6/1997 | Blakeney et al. | |
| 5,649,289 A | 7/1997 | Wang et al. | |
| 5,668,803 A | 9/1997 | Tymes et al. | |
| 5,793,303 A | 8/1998 | Koga | |
| 5,794,128 A | 8/1998 | Brockel et al. | |
| 5,812,589 A | 9/1998 | Sealander et al. | |
| 5,815,811 A | 9/1998 | Pinard et al. | |
| 5,828,960 A | 10/1998 | Tang et al. | |
| 5,844,900 A | 12/1998 | Hong et al. | |
| 5,875,179 A | 2/1999 | Tikalsky | |
| 5,896,561 A | 4/1999 | Schrader et al. | |
| 5,915,214 A | 6/1999 | Reece et al. | |
| 5,920,821 A | 7/1999 | Seazholtz et al. | |
| 5,933,607 A | 8/1999 | Tate et al. | |
| 5,949,988 A | 9/1999 | Feisullin et al. | |
| 5,953,669 A | 9/1999 | Stratis et al. | |
| 5,960,335 A | 9/1999 | Umemoto et al. | |
| 5,982,779 A | 11/1999 | Krishnakumar et al. | |
| 5,987,062 A | 11/1999 | Engwer et al. | |
| 5,987,328 A | 11/1999 | Ephremides et al. | |
| 6,005,853 A | 12/1999 | Wang et al. | |
| 6,011,784 A | 1/2000 | Brown | |
| 6,078,568 A | 6/2000 | Wright | |
| 6,088,591 A | 7/2000 | Trompower | |
| 6,119,009 A | 9/2000 | Baranger et al. | |
| 6,160,804 A | 12/2000 | Ahmed et al. | |
| 6,199,032 B1 | 3/2001 | Anderson | |
| 6,208,629 B1 | 3/2001 | Jaszewki et al. | |
| 6,208,841 B1 | 3/2001 | Wallace et al. | |
| 6,218,930 B1 | 4/2001 | Katzenberg et al. | |
| 6,240,078 B1 | 5/2001 | Kuhnel et al. | |
| 6,240,083 B1 | 5/2001 | Wright | |
| 6,256,300 B1 | 7/2001 | Ahmed et al. | |
| 6,256,334 B1 | 7/2001 | Adachi | |
| 6,285,662 B1 | 9/2001 | Watannabe | |
| 6,317,599 B1 | 11/2001 | Rappaport et al. | |
| 6,336,035 B1 | 1/2002 | Somoza et al. | |
| 6,347,091 B1 | 2/2002 | Wallentin et al. | |
| 6,356,758 B1 | 3/2002 | Almeida et al. | |
| 6,393,290 B1 | 5/2002 | Ulfongene | |
| 6,404,772 B1 | 6/2002 | Beach et al. | |
| 6,473,449 B1 | 10/2002 | Cafarella et al. | |
| 6,493,679 B1 | 12/2002 | Rappaport et al. | |
| 6,496,290 B1 | 12/2002 | Lee | |
| 6,512,916 B1 | 1/2003 | Forbes, Jr. | |
| 6,580,700 B1 | 6/2003 | Pinard et al. | |
| 6,631,267 B1 | 10/2003 | Clarkson et al. | |
| 6,659,947 B1 | 12/2003 | Carter et al. | |
| 6,687,498 B2 | 2/2004 | McKenna et al. | |
| 6,747,961 B1 | 6/2004 | Ahmed et al. | |
| 6,879,812 B2 | 4/2005 | Agrawal et al. | |
| 6,973,622 B1 | 12/2005 | Rappaport et al. | |
| 7,062,566 B2 * | 6/2006 | Amara et al. | 709/229 |
| 7,155,518 B2 * | 12/2006 | Forslow | 709/227 |
| 2002/0068278 A1 | 6/2002 | Forslow | |
| 2002/0191572 A1 | 12/2002 | Weinstein et al. | |
| 2004/0047320 A1 | 3/2004 | Eglin | |
| 2004/0095932 A1 | 5/2004 | Astarabadi et al. | |
| 2004/0143428 A1 | 7/2004 | Rappaport et al. | |
| 2004/0221042 A1 * | 11/2004 | Meier | 709/227 |
| 2004/0236702 A1 * | 11/2004 | Fink et al. | 705/73 |
| 2004/0259555 A1 | 12/2004 | Rappaport et al. | |
| 2005/0059405 A1 | 3/2005 | Thomson et al. | |
| 2005/0059406 A1 | 3/2005 | Thomson et al. | |
| 2005/0068925 A1 | 3/2005 | Palm et al. | |
| 2005/0073980 A1 | 4/2005 | Thomson et al. | |

FOREIGN PATENT DOCUMENTS

WO WO99/11003 3/1999

OTHER PUBLICATIONS

Acampora and Winters, IEEE Journal on selected Areas in Communications. *SAC-5*:796-804 (1987).

Bing and Subramanian, IEEE, 1318-1322 (1997).

Durgin, et al., "Measurements and Models for Radio Path Loss and Penetration Loss in and Around Homes and Trees at 5.85 GHz", IEEE Transactions on Communications, vol. 46, No. 11, Nov. 1998.

Freret et al., Applications of Spread-Spectrum Radio to Wireless Terminal Communications, Conf. Record, Nat'l Telecom. Conf., Nov. 30-Dec. 4, 1980.

Fortune et al., IEEE Computational Science and Engineering, "Wise Design of Indoor Wireless Systems: Practical Computation and Optimization", p. 58-68 (1995).

Geier, Jim, Wireless Lans Implementing Interoperable Networks, Chapter 3 (pp. 89-125) Chapter 4 (pp. 129-157) Chapter 5 (pp. 159-189) and Chapter 6 (pp. 193-234), 1999, United States.

Ho et al., "Antenna Effects on Indoor Obstructed Wireless Channels and a Deterministic Image-Based Wide-Based Propagation Model for In-Building Personal Communications Systems", International Journal of Wireless Information Networks, vol. 1, No. 1, 1994.

Kim et al., "Radio Propagation Measurements and Prediction Using Three-Dimensional Ray Tracing in Urban Environments at 908 MHz and 1.9 GHz", IEEE Transactions on Vehicular Technology, vol. 48, No. 3, May 1999.

Kleinrock and Scholl, Conference record 1977 ICC vol. 2 of 3, Jun. 12-15 Chicago Illinois "Packet Switching in radio Channels: New Conflict-Free Multiple Access Schemes for a Small Number of data Useres", (1977).

LAN/MAN Standars Committee of the IEEE Computer Society, Part 11:Wireless LAN Medium Access Control (MAC) and Physical Layer (PHY) Specifications:Higher Speed Physical Layer Extension in the 2.4 GHz Band, IEEE Std. 802.11b (1999).

Okamoto and Xu, IEEE, Proceeding so of the 13$^{th}$ Annual Hawaii International Conference on System Sciences, pp. 54-63 (1997).

Panjwani et al., "Interactive Computation of Coverage Regions for Wireless Communication in Multifloored Indoor Environments", IEEE Journal on Selected Areas in Communications, vol. 14, No. 3, Apr. 1996.

Perram and Martinez, "Technology Developments for Low-Cost Residential Alarm Systems", Proceedings 1977 Carnahan Conference on Crime Countermeasures, Apr. 6-8, pp. 45-50 (1977).

Piazzi et al., "Achievable Accuracy of Site-Specific Path-Loss Predictions in Residential Environments", IEEE Transactions on Vehicular Technology, vol. 48, No. 3, May 1999.

Seidel et al., "Site-Specific Propagation Prediction for Wireless In-Building Personal Communications System Design", IEEE Transactions on Vehicular Technology, vol. 43, No. 4, Nov. 1994.

Skidmore et al., "Interactive Coverage Region and System Design Simulation for Wireless Communication Systems in Multi-floored Indoor Environments, SMT Plus" IEEE ICUPC '96 Proceedings (1996).

Ullmo et al., "Wireless Propagation in Buildings: A Statistic Scattering Approach", IEEE Transactions on Vehicular Technology, vol. 48, No. 3, May 1999.

U.S. Appl. No. 11/326,966, filed Jan. 5, 2006, Taylor.
U.S. Appl. No. 11/330,877, filed Jan. 11, 2006, Matta.
U.S. Appl. No. 11/331,789, filed Jan. 14, 2006, Matta et al.
U.S. Appl. No. 11/351,104, filed Feb. 8, 2006, Tiwari.
U.S. Appl. No. 11/377,859, filed Mar. 15, 2006, Harkins.
U.S. Appl. No. 11/400,165, filed Apr. 5, 2006, Tiwari.
U.S. Appl. No. 11/445,750, filed May 3, 2006, Matta.
U.S. Appl. No. 11/417,830, filed May 30, 2006, Morain.
U.S. Appl. No. 11/417,993, filed May 3, 2006, Jar et al.
U.S. Appl. No. 11/437,537, filed May 19, 2006, Freund et al.
U.S. Appl. No. 11/437,538, filed May 19, 2006, Zeldin.
U.S. Appl. No. 11/437,387, filed May 19, 2006, Zeldin et al.
U.S. Appl. No. 11/437,582, filed May 19, 2006, Bugwadia et al.
U.S. Appl. No. 11/451,704, filed Jun. 12, 2006, Riley.

* cited by examiner

STATION MOBILITY BETWEEN ACCESS POINTS

BACKGROUND

Transparent mobility permits a wireless station to be handed off between wireless access points without packet loss, without noticeable delay to the station user, and/or without loss of session continuity. Enabling the transparent mobility of a station among access points is a goal of Inter-Access Point Protocol (IAPP). However, IAPP for years has been at the stage of an unapproved draft IEEE standard 802.11f. In addition, 802.11f support is uncertain for all the attributes necessary for transparent mobility among access points, and extremely unlikely with regard to mobile VLAN support, due to the lack of focus on the distribution system in 802.11f. Thus, it would be desirable to enable transparent mobility between access points, while maintaining support for the VLANs utilized by a user of a mobile station.

SUMMARY

Transparent mobility can be enabled by communicating session data, including backed up packets and/or Authentication, Authorization and Accounting (AAA) data, between access points, and/or communicating tunneling VLAN data between the distribution system managing the access points.

Communicating the AAA data, such as keys, between access points is one element that enables the fast handoff of a station from an old access point to a new access point, by eliminating the time which would otherwise be spent at the new access point reauthenticating the handed off station, etc.

In addition, a tunnel can automatically be created between the distribution system switches. VLAN data is subsequently tunneled between the switches of the distribution system. Tunneling VLAN data also simplifies configuration of the distribution system switches, because relevant VLAN can be configured on only some switches of the distribution system, rather than on every switch of the distribution system. Tunneling VLAN data from the correct distribution system switch also saves bandwidth, as compared to broadcasting the VLAN data to all switches of the distribution system.

DETAILED DESCRIPTION

Figure 1:
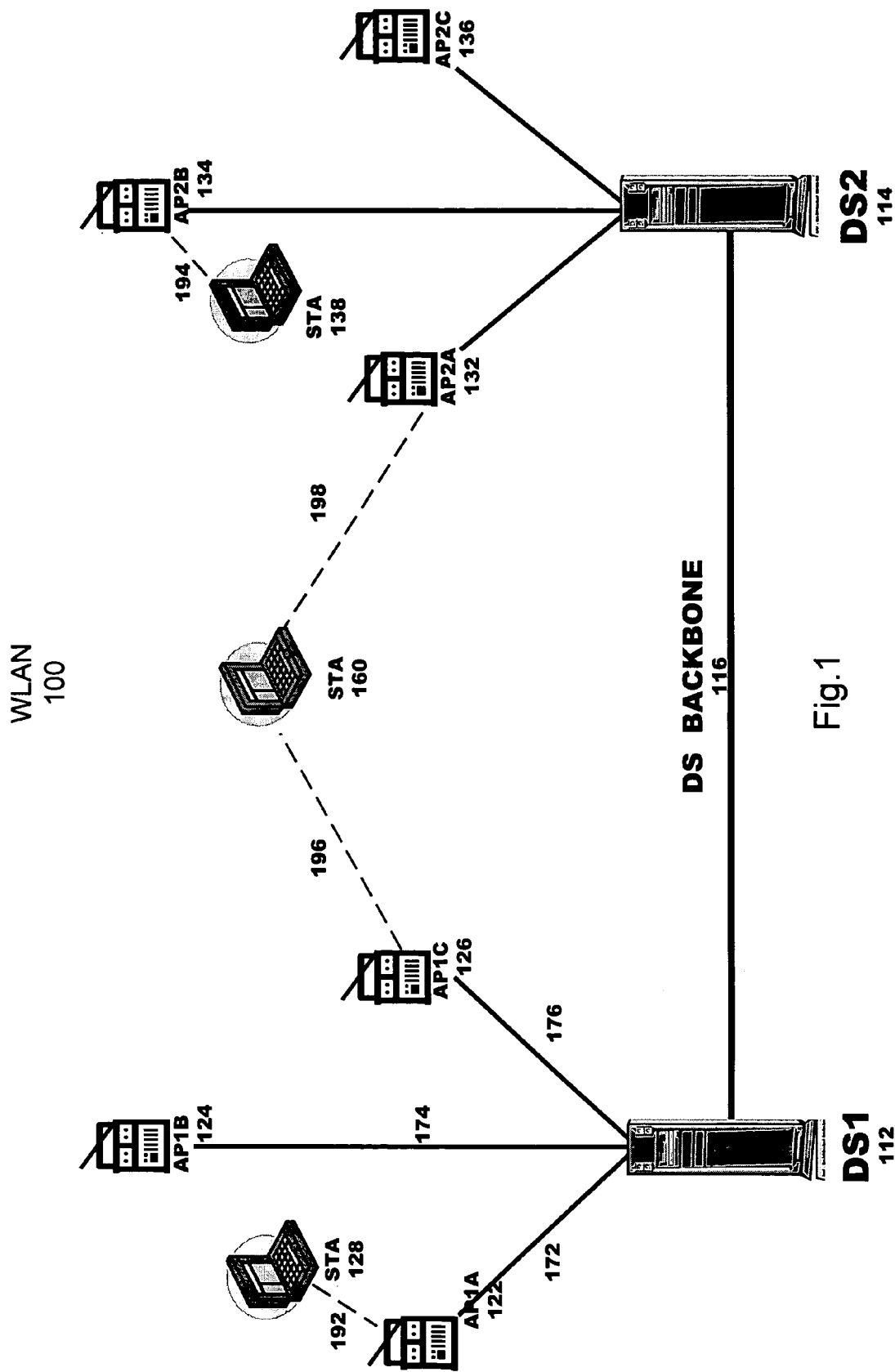
FIG. 1 shows an example deployment of a WLAN.

FIG. 1 shows an example deployment of a WLAN 100. The distribution system 110 includes a first distribution system switch DS1 112, a second distribution system switch DS2 114, and a distribution system backbone 116 connecting the first distribution system switch DS1 112 and the second distribution system switch DS2 114. In some embodiments, the distribution system switches can support thin access points on at least some ports. A first extended service set network ESS1 120 includes the first distribution system switch DS1 112, access point AP1A 122, access point AP1B 124, access point AP1C 126, and station 128. Access point AP1A 122, access point AP1B 124, and access point AP1C 126 are connected to the first distribution system switch DS1 112 by wired links 172, 174, and 176, respectively. Station 128 and access point AP1A 122 are connected via wireless link 192, and form a first basic service set network BSS1 140. A second extended service set network ESS2 130 includes the second distribution system switch DS2 114, access point AP2A 132, access point AP2B 134, access point AP2C 136, and station 138. Access point AP2A 132, access point AP2B 134, and access point AP2C 136 are connected to the second distribution system switch DS2 114 by wired links 182, 184, and 186, respectively. Station 138 and access point AP2B 134 are connected via wireless link 194, and form a second basic service set network BSS2 150. Station 160 is in process of being handed off between access point AP1C 126 of the first extended service set network ESS1 120 and access point AP2A 132 of the second extended service set network ESS2 130, and thereby is associated with two wireless links 196 and 198 to access point AP1C 126 and access point AP2A 132, respectively.

Various embodiments are shown. Each shown embodiment can be modified, such as by adding, removing, and/or changing one or more portions, and/or rearranging one or more portions.

Various types of user roaming can occur from a distribution system switch in the same cluster, with different types of "recognition".

In one case, roaming between distribution system switches in the same cluster can use an 802.11 reassociation. A reassociation packet includes the address of an access point that the user is roaming from. A distribution system switch has a list (which can be distributed beforehand) of all access point addresses, and the particular distribution system switches in that cluster the AP is attached to. A "roamed-to" distribution system switch can directly contact a "roamed-from" distribution system switch.

In another case, a user can send an 802.11 associate packet. The distribution system switch can send message to all other cluster members asking if user is known (how broken clients actually work that don't send reassociate packet) (broadcast everytime user enters system)

Figure 2:
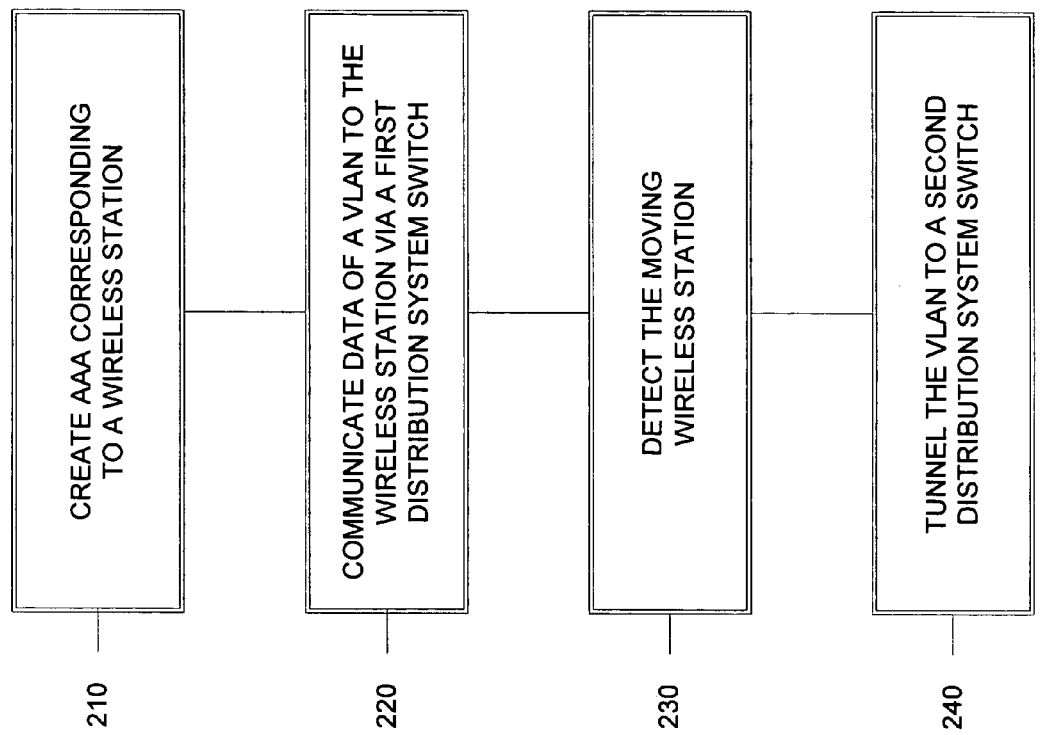
FIG. 2 shows an embodiment of a wireless local area network method that includes VLAN tunneling between distribution system switches in response to detection of a moving wireless station.

FIG. 2 shows an embodiment of a wireless local area network method that includes VLAN tunneling between distribution system switches in response to detection of a moving wireless station.

In 210, AAA data are created corresponding to a wireless station. This can occur at least partly prior to communicating data of a first virtual local area network to the wireless station via a first distribution system switch connected to the first virtual local area network. The AAA data corresponding to the wireless station can be stored at the first distribution system switch. The AAA data corresponding to the wireless station can be transferred to a second distribution system switch. The second distribution system switch is connected to an access point which a wireless station moves to.

AAA data include authentication data such as keys; authorization data such as access lists and VLAN association information (i.e. for network security), and whether or not a user is permitted to connect to a particular distribution system switch and/or access point; and accounting data, such as a complete or incomplete session history including roams, total packets sent, error packets, etc.

In 220, data of the first virtual local area network are communicated to the wireless station via the first distribution system switch. This occurs at least partly prior to the wireless station moving from a first wireless area of a first access point to a second wireless area of a second access point. Both the first access point and the second access point belong to a wireless local area network.

In 230, a moving wireless station is detected. More particularly, it is detected that the wireless station moves in a wireless local area network. The movement is from a first wireless area to a second wireless area. The first wireless area corresponds to a first access point, such that wireless stations in the first wireless area can associate with the first access point. The second wireless area corresponds a second access point, such that wireless stations in the second wireless area can associate with the second access point. The first wireless area and the second wireless area can partly or completely overlap, and/or not overlap. Both the first access point and the second access point are access points of a wireless local area network. Detection of the movement can be logical detection of movement. For example, the second access point can be said to have detected movement of the wireless station upon successful communication with the wireless station. Detection of the movement can be physical. For example, movement of the wireless station can be detected based upon measurements of the radio emissions of the wireless station.

The wireless local area network can include an interconnected distribution system, and multiple access points, such as the first access point and the second access point. The interconnected distribution system can include multiple distribution system switches, such as a first distribution system switch and a second distribution system switch. The first distribution system switch is connected to the first access point. The second distribution system switch is connected to the second access point.

The wireless station can correspond to at least a first virtual local area network of the wireless local area network. For example, one or more users of the wireless station can be users of the first virtual local area network. The first virtual local area network is connected to at least the first distribution system switch.

In 240, in response to the wireless station moving in the wireless local area network, the first virtual local area network is tunneled to the second distribution system switch. In some embodiments, such tunneling can occur if the second distribution system switch is not connected to the first virtual local area network. One type of tunneling includes layer 3 tunneling of layer 2 virtual local area network data. Tunneling can include communicating data of the first virtual local area network to the wireless station via the second distribution system switch. This can occur at least partly after the wireless station moves from the first wireless area to the second wireless area. Tunneling can include tunneling the first virtual local area network from the first distribution system switch and/or from a third distribution system switch. The third distribution system switch can be part of the interconnected distribution system of the wireless local area network, along with the first distribution system switch and the second distribution system switch. The third distribution system switch is connected to the first virtual local area network.

Figure 3:
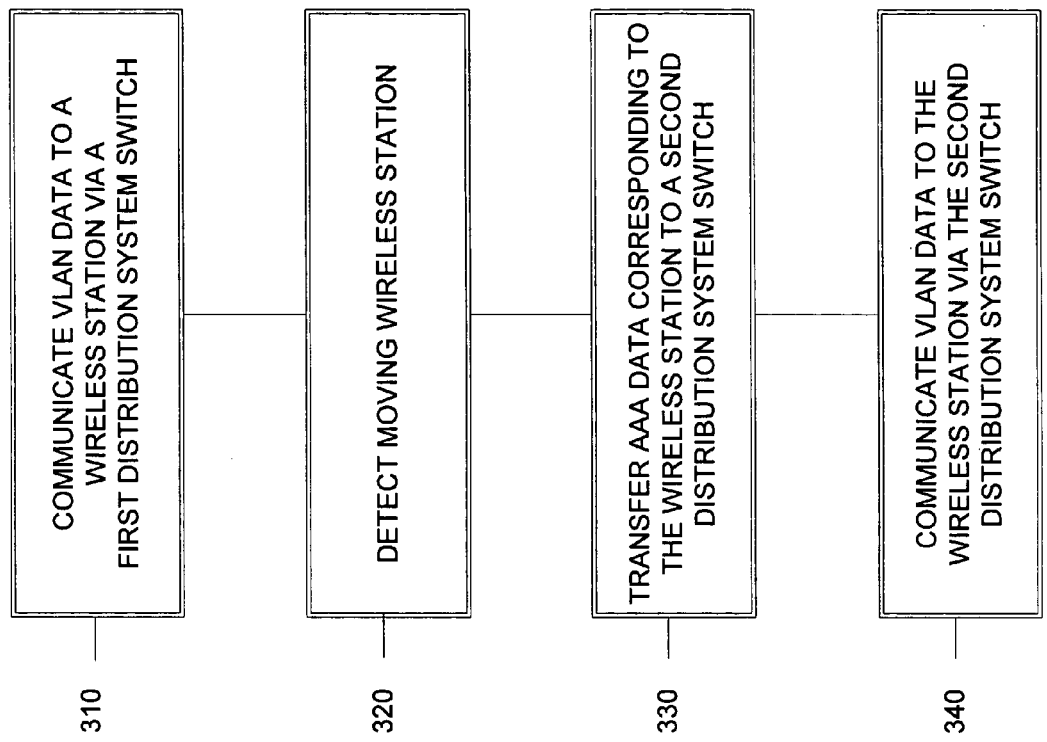
FIG. 3 shows another embodiment of a wireless local area network method, that includes the transfer of AAA data between distribution system switches in response to detection of a moving wireless station.

FIG. 3 shows another embodiment of a wireless local area network method, that includes the transfer of AAA data between distribution system switches in response to detection of a moving wireless station.

In 310, data of the first virtual local area network are communicated to the wireless station via the first distribution system switch. This occurs at least partly prior to the wireless station moving from a first wireless area of a first access point to a second wireless area of a second access point. Both the first access point and the second access point belong to a wireless local area network.

In 320, a moving wireless station is detected. More particularly, it is detected that the wireless station moves in a wireless local area network. The movement is from a first wireless area to a second wireless area. The first wireless area corresponds to a first access point, such that wireless stations in the first wireless area can associate with the first access point. The second wireless area corresponds a second access point, such that wireless stations in the second wireless area can associate with the second access point. The first wireless area and the second wireless area can partly or completely overlap, and/or not overlap. Both the first access point and the second access point are access points of a wireless local area network. Detection of the movement can be logical detection of movement. For example, the second access point can be said to have detected movement of the wireless station upon successful communication with the wireless station. Detection of the movement can be physical. For example, movement of the wireless station can be detected based upon measurements of the radio emissions of the wireless station.

The wireless local area network can include an interconnected distribution system, and multiple access points, such as the first access point and the second access point. The interconnected distribution system can include multiple distribution system switches, such as a first distribution system switch and a second distribution system switch. The first distribution system switch is connected to the first access point. The second distribution system switch is connected to the second access point.

The wireless station can correspond to at least a first virtual local area network of the wireless local area network. For example, one or more users of the wireless station can be users of the first virtual local area network. The first virtual local area network is connected to at least the first distribution system switch and the first distribution system switch.

In 330, in response to the wireless station moving in the wireless local area network, AAA data corresponding to the wireless station are transferred to the second distribution system switch. The AAA data corresponding to the wireless station can be stored at the first distribution system switch. In some embodiments, the AAA data corresponding to the wireless station can be created at least partly prior to communicating data of the first virtual local area network to the wireless station via the first distribution system switch.

In 340, data of the first virtual local area network are communicated to the wireless station via the second distribution system switch. This occurs at least partly after the wireless station moves from the first wireless area to the second wireless area. In some embodiments, communicating data of the first virtual local area network to the wireless station via the second distribution system switch can occur without communicating the data via the first distribution system switch.

Figure 4:
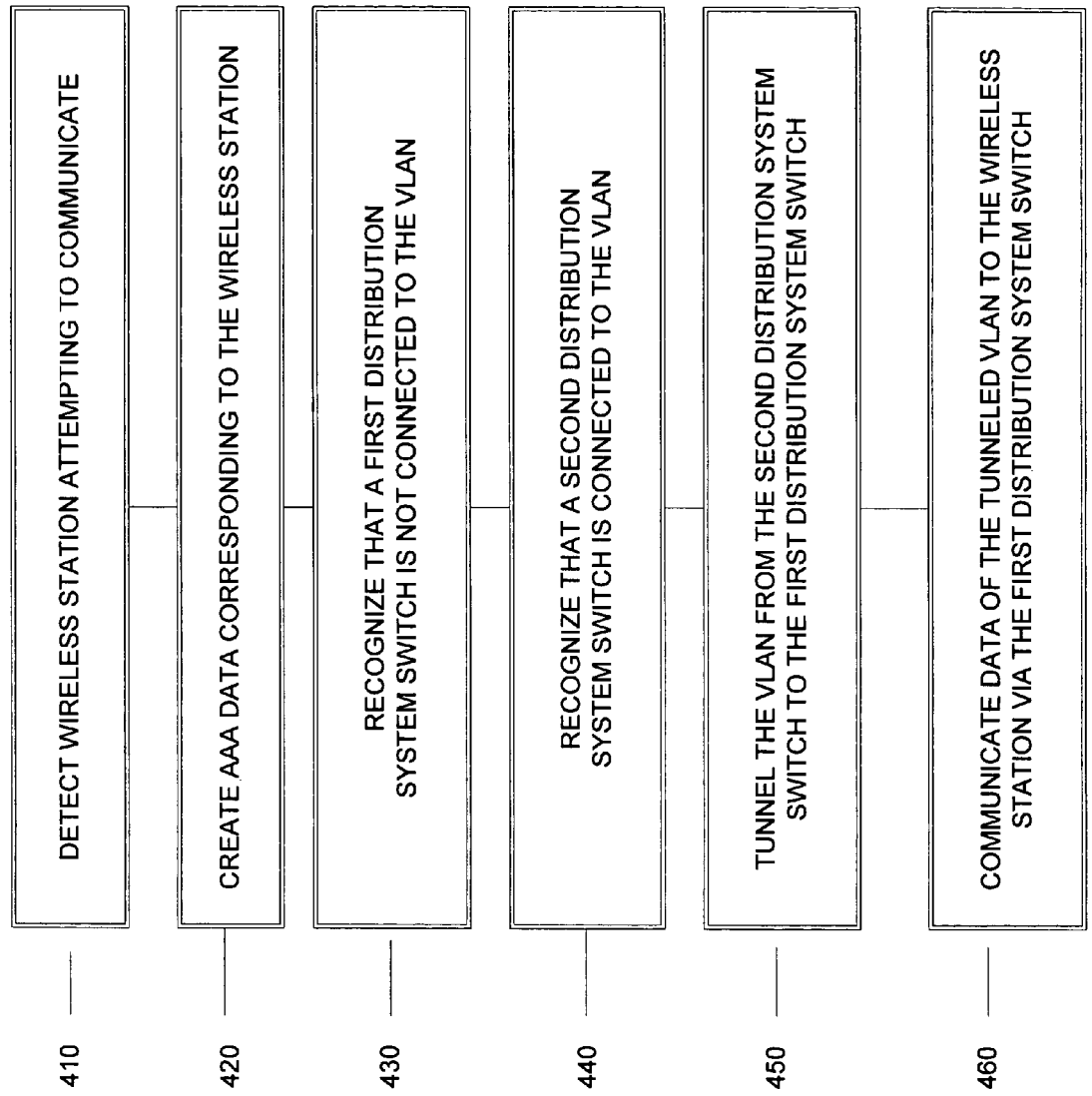
FIG. 4 shows another embodiment of a wireless local area network method, including recognizing distribution system switches connected and not connected to a VLAN, and VLAN tunneling between distribution system switches.

FIG. 4 shows another embodiment of a wireless local area network method, including recognizing distribution system switches connected and not connected to a VLAN, and VLAN tunneling between distribution system switches.

In 410, a wireless station attempting to communicate is detected. Detection of attempting to communicate can be logical and/or physical detection. More particularly, it is detected that the wireless station is attempting to communicate with a first virtual local area network via a first access point. The first access point is an access point of a wireless local area network. The first access point is connected to a first distribution system switch of the wireless local area network.

In response to the wireless station attempting to communicate, one or more events can occur.

In 420, AAA data corresponding to the wireless station are created. The AAA data corresponding to the wireless station can be stored at the first distribution system switch.

In 430, it is recognized that the first distribution system switch is not connected to the first virtual local area network.

In 440, it is recognized that a second distribution system switch is connected to the first virtual local area network. The first distribution system switch and the second distribution system switch are at least part of an interconnected distribution system of the wireless local area network. AAA data corresponding to the wireless station can be transferred to the second distribution system switch. For example, AAA data corresponding to the wireless station can be communicated from the first distribution system switch to the second distribution system switch.

In 450, the first virtual local area network is tunneled from the second distribution system switch to the first distribution system switch. This can occur after communicating AAA data corresponding to the wireless station from the first distribution system switch to the second distribution system switch. The tunneling can include layer 3 tunneling of layer 2 virtual local area network data.

In 460, data of the tunneled first virtual local area network are communicated to the wireless station via the first distribution system switch. This can occur after AAA data corresponding to the wireless station are communicated from the first distribution system switch to the second distribution system switch.

Figure 5A:
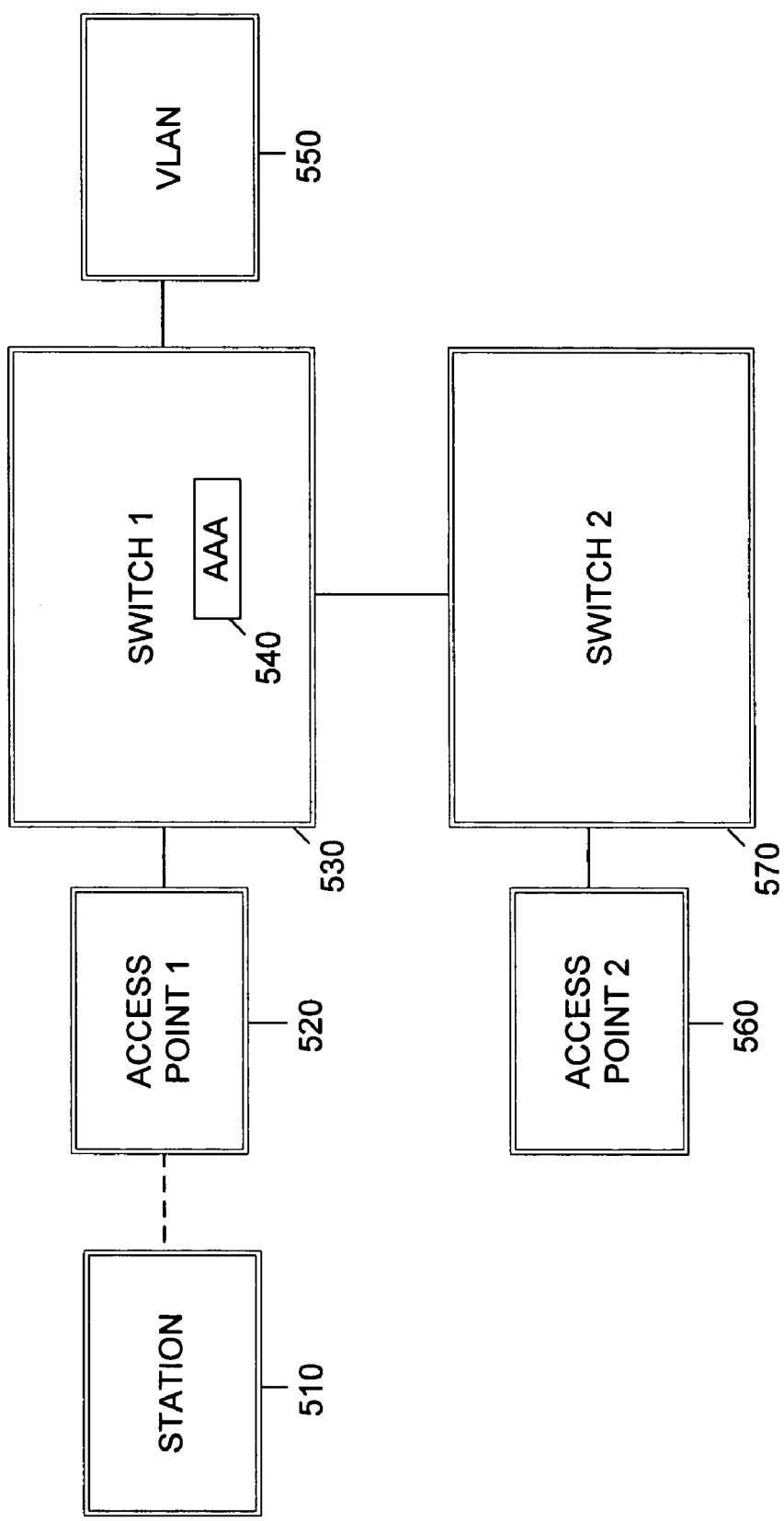
FIGS. 5A, 5B, and 5C show examples of embodiments with VLAN tunneling and AAA data transfer.
Figure 5B:
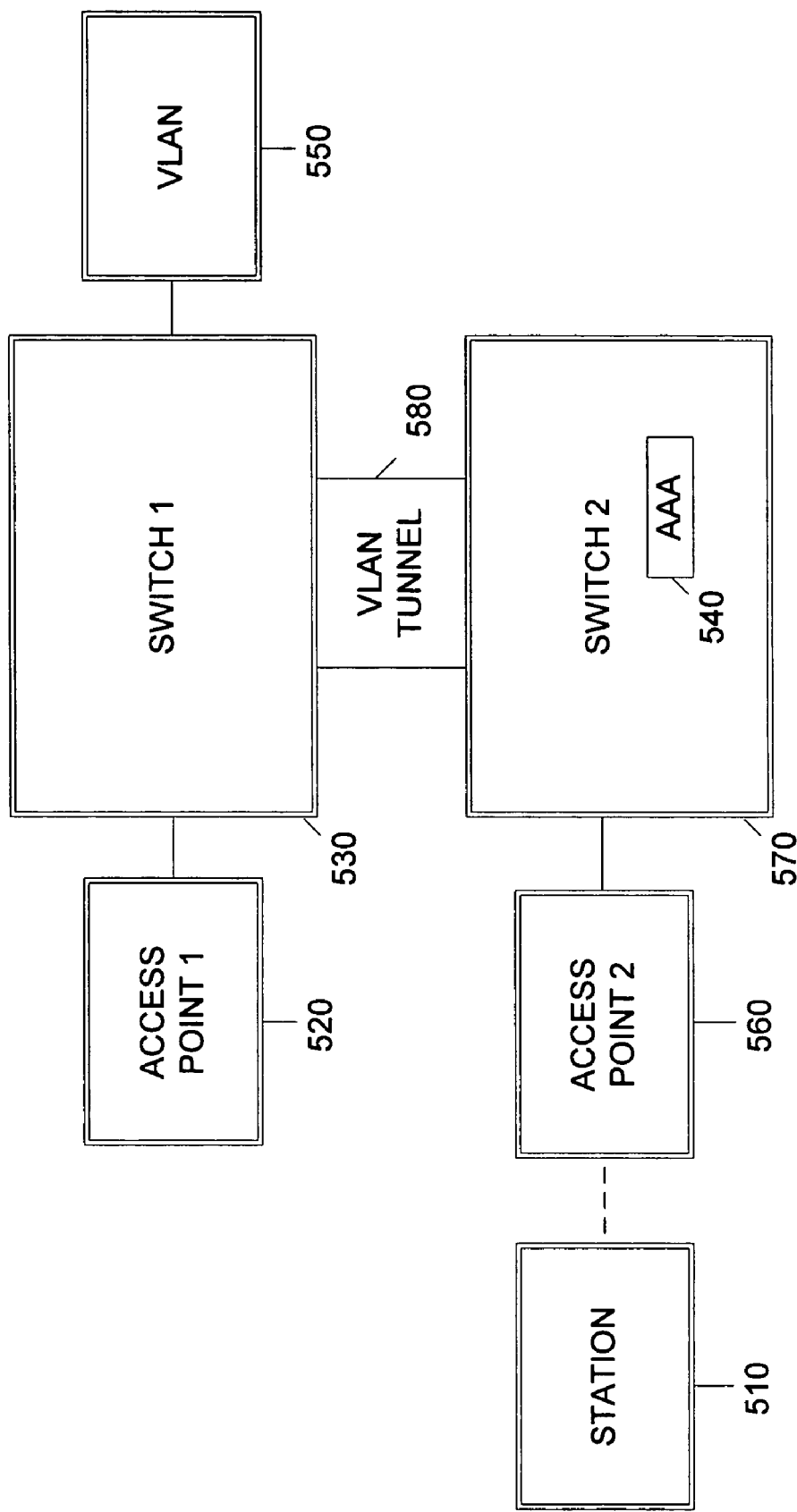
Figure 5C:
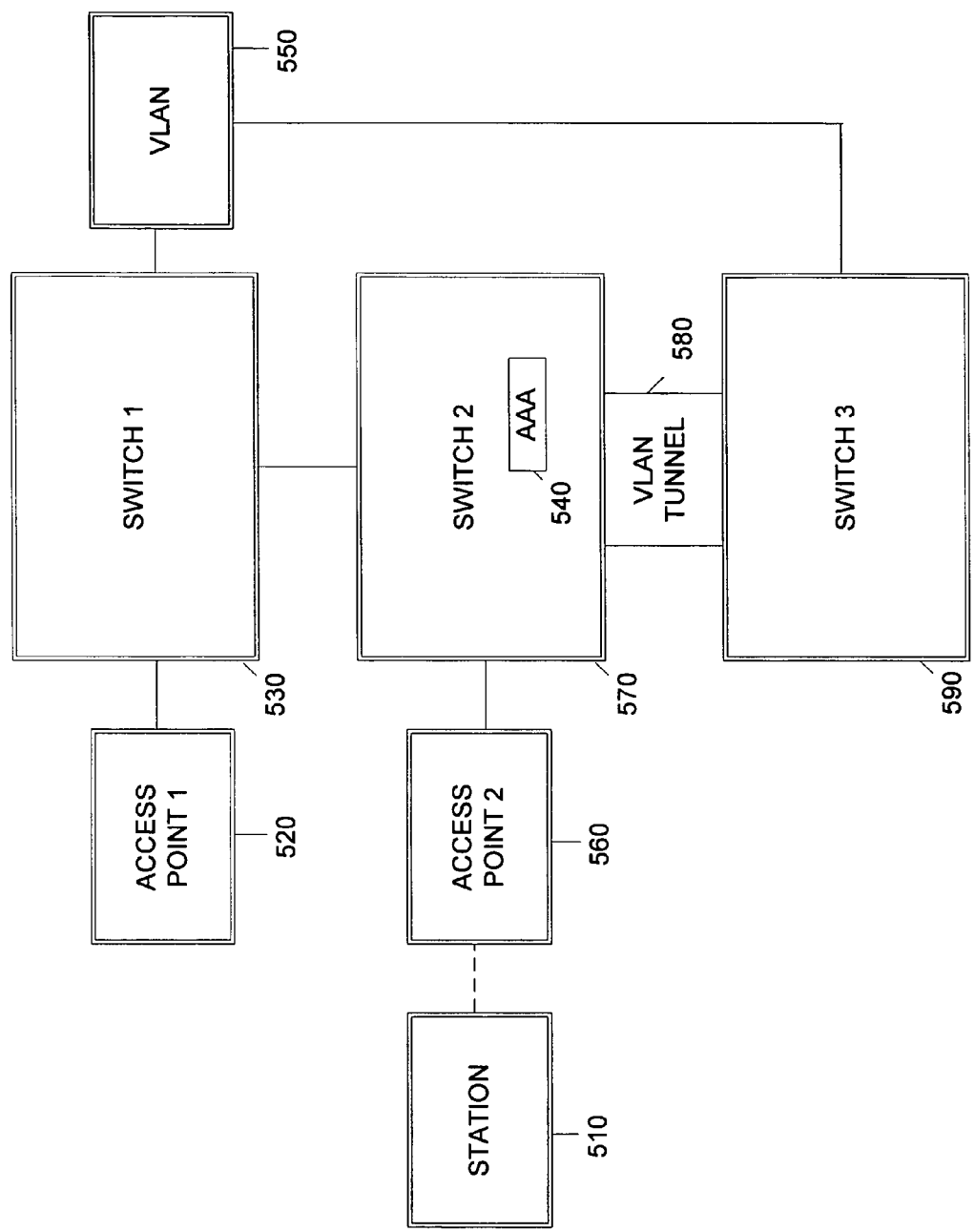

FIGS. 5A, 5B, and 5C show examples of embodiments with VLAN tunneling and AAA data transfer.

In FIG. 5A, a wireless station 510 has a wireless link with an access point 1 520. Access point 1 520 is connected to distribution system switch 1 530. AAA data 540 corresponding to wireless station 510 is at distribution system switch 1 530. Wireless station 510 is associated with a VLAN 550 connected to distribution system switch 1 530.

In FIG. 5B, a wireless station 510 has moved to have a wireless link with another access point 2 560. Access point 2 560 is connected to distribution system switch 2 570. AAA data 540 corresponding to wireless station 510 is at distribution system switch 2 570; AAA data 540 may have been transferred from distribution system switch 1 530. Because distribution system switch 2 570 is not connected to VLAN 550, VLAN 550 is tunneled 580 from distribution system switch 1 530 to distribution system switch 2 570. The tunnel 580 can be a newly created tunnel or an already existing tunnel. This can be layer 3 tunneling of a layer 2 VLAN.

FIGS. 5A and 5B therefore show a seamless roam of the wireless station 510 from distribution system switch 1 530 to distribution system switch 2 570, with AAA data VLAN connection taken care of.

FIGS. 5C shows an alternative to FIG. 5B. A seamless roam of the wireless station 510 from distribution system switch 1 530 to distribution system switch 2 570 does not require the VLAN tunnel 580 to be from distribution system 1 530. Distribution system switch 1 530, distribution system switch 2 570, and distribution system switch 3 590, can be part a cluster mutually sharing information about which VLANs are connected to which distribution system switch. VLAN 550 is connected to both distribution system switch 1 530 and distribution system switch 3 590. When wireless station 510 roams from distribution system switch 1 530 to distribution system switch 2 570, then VLAN 550 is tunneled 580 from distribution system switch 3 590 to distribution system switch 2 570.

Clusters can also share information about other distribution system switches in the same cluster, such as known IP addresses of other distribution system switches, and/or addresses of attached access points, with other distribution system switches in the same cluster.

Figure 6A:
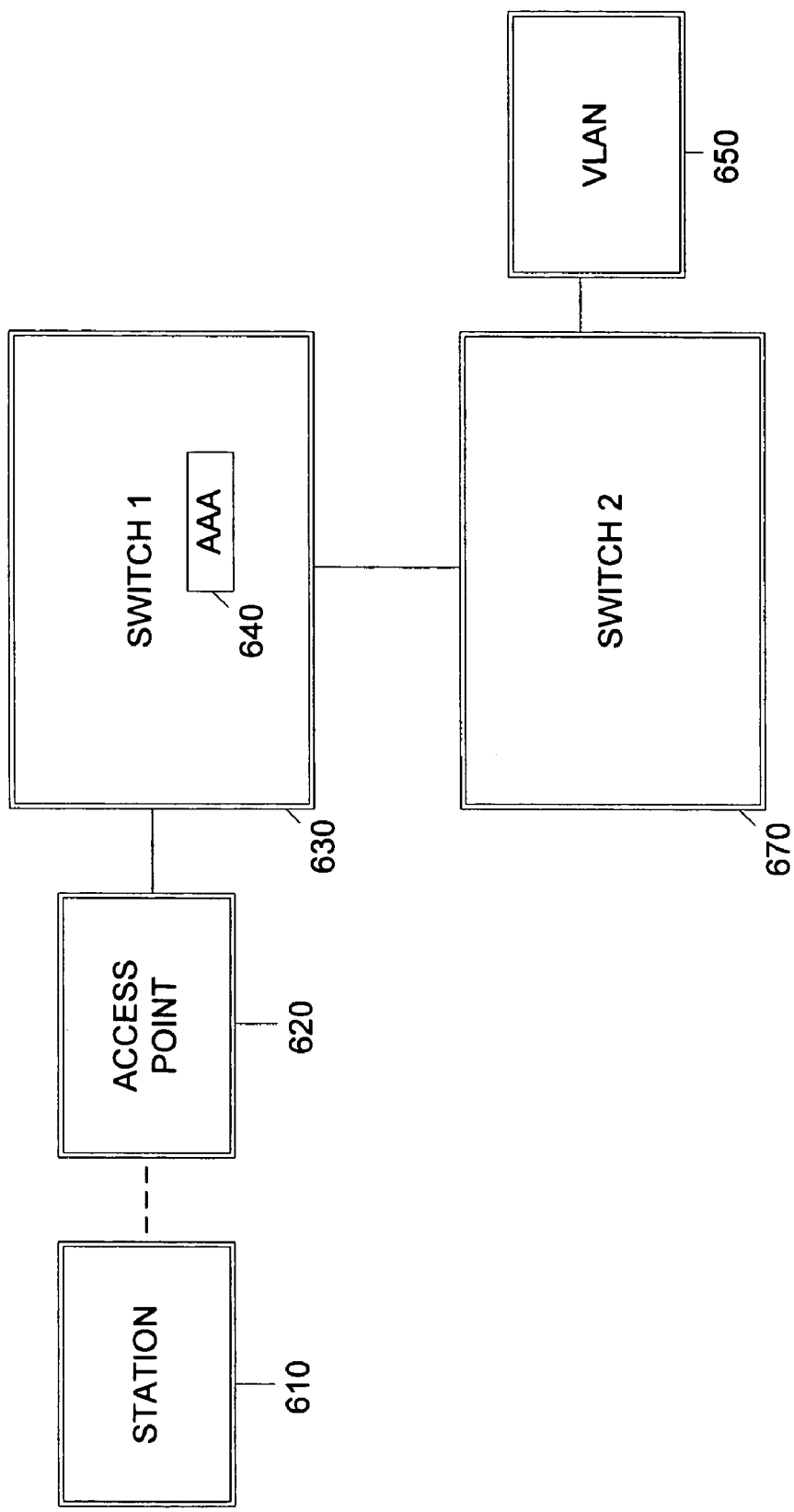
FIGS. 6A and 6B show an example of an embodiment with VLAN tunneling, but no AAA transfer.
Figure 6B:
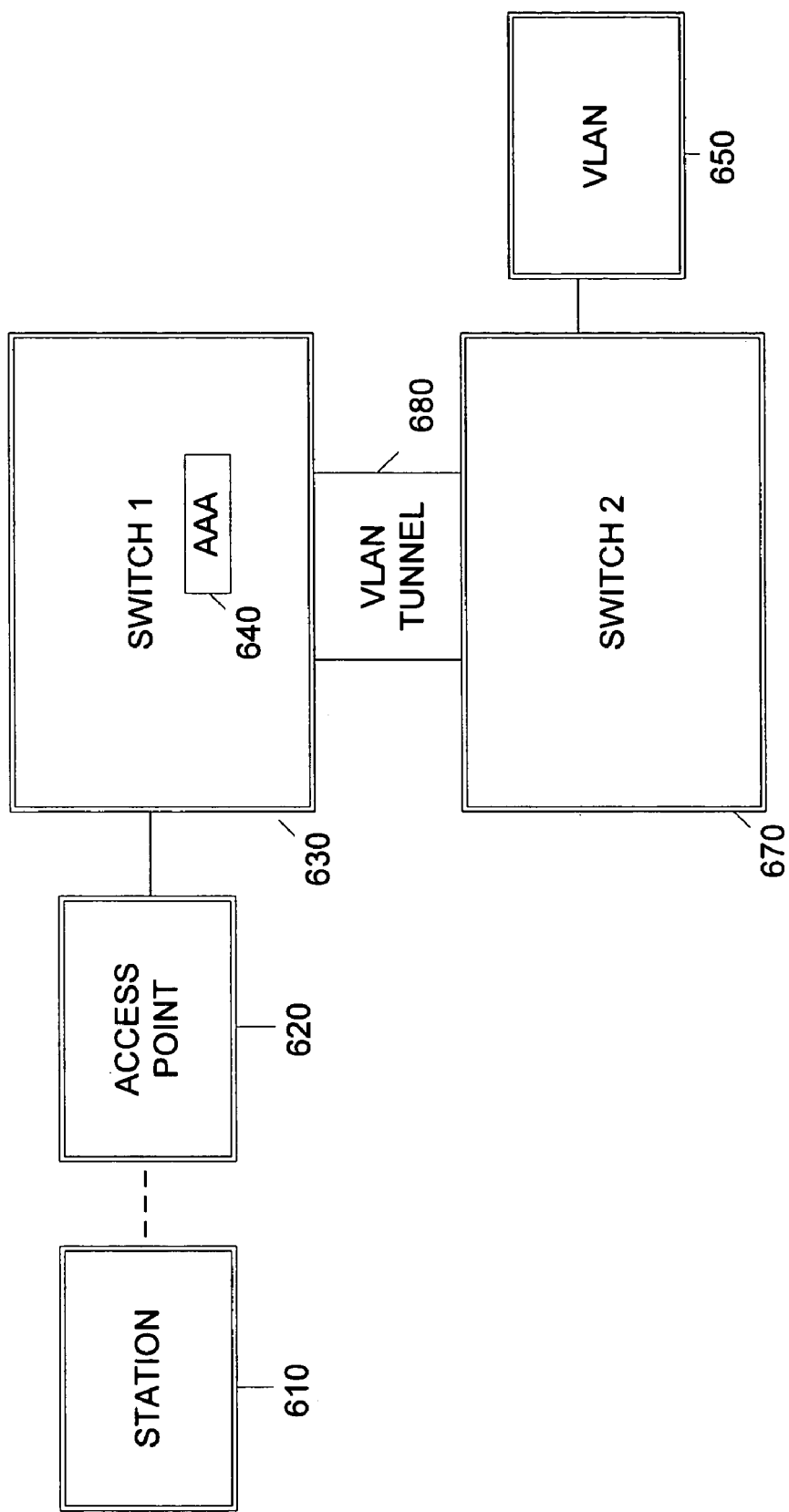

FIGS. 6A and 6B show an example of an embodiment with VLAN tunneling, but no AAA transfer.

In FIG. 6A, distribution system switch 1 630 finds out from other distribution system switches in its cluster which VLANs are connected to which distribution system switches. Distribution system switch 1 630 thereby has the information that VLAN 650 is connected to distribution system switch 2 670. Wireless station 610 forms a wireless link with access point 620 connected to distribution system switch 1 630. Distribution system switch 1 630 determines from AAA data 640 that wireless station 610 should connect to VLAN 650.

In FIG. 6B, distribution system switch 1 630 recognizes that it is not connected to VLAN 650, and that distribution system switch 2 670 is connected to VLAN 650. A VLAN tunnel 680 is used from distribution system switch 2 670 to distribution system switch 1 630 for VLAN 650.

At the conclusion of FIGS. 6A and 6B, wireless station 610 has a wireless link with distribution system switch 1 630, and a connection to VLAN 650.

Figure 7A:
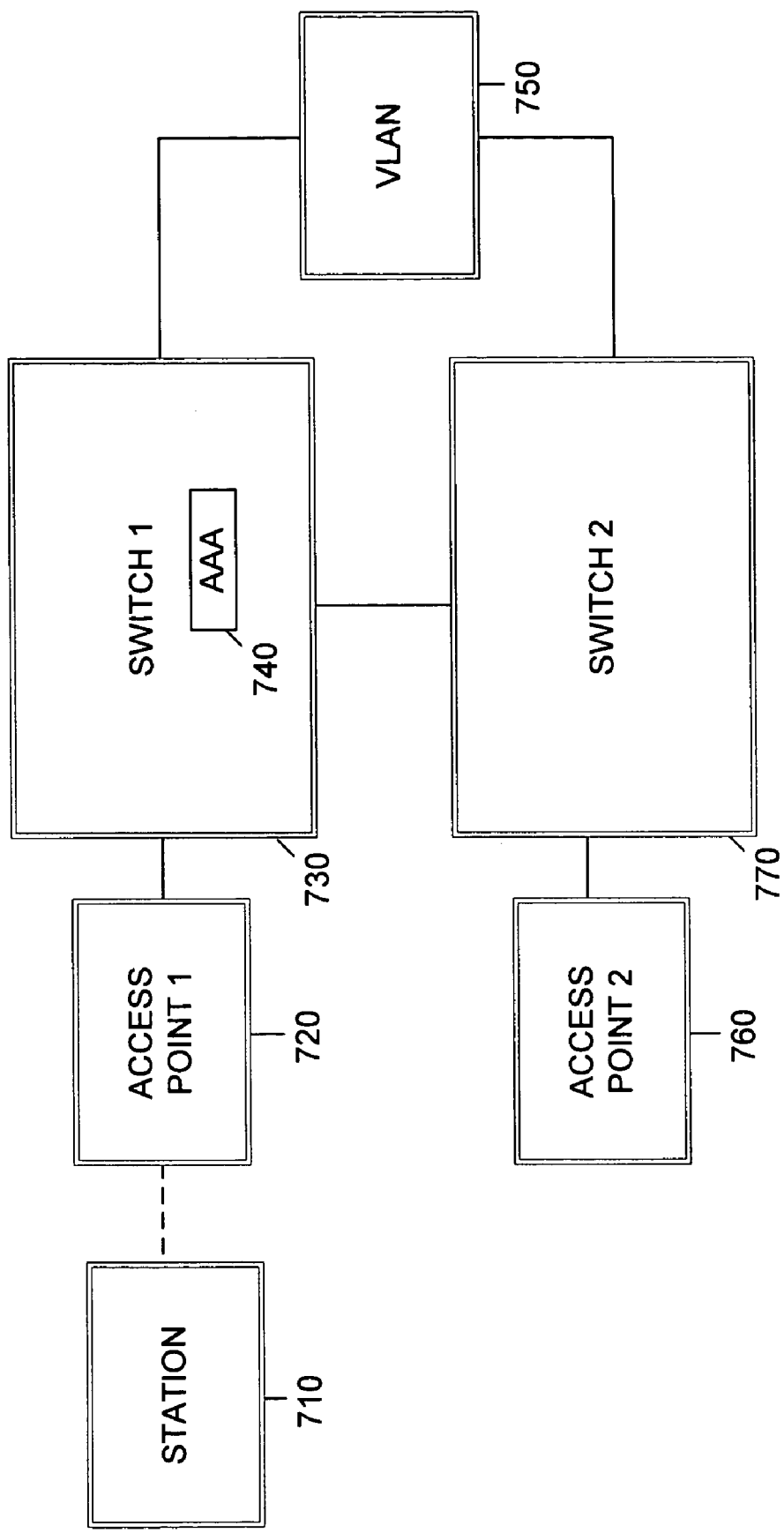
FIGS. 7A and 7B show an example of an embodiment with AAA transfer, but no VLAN tunneling.
Figure 7B:
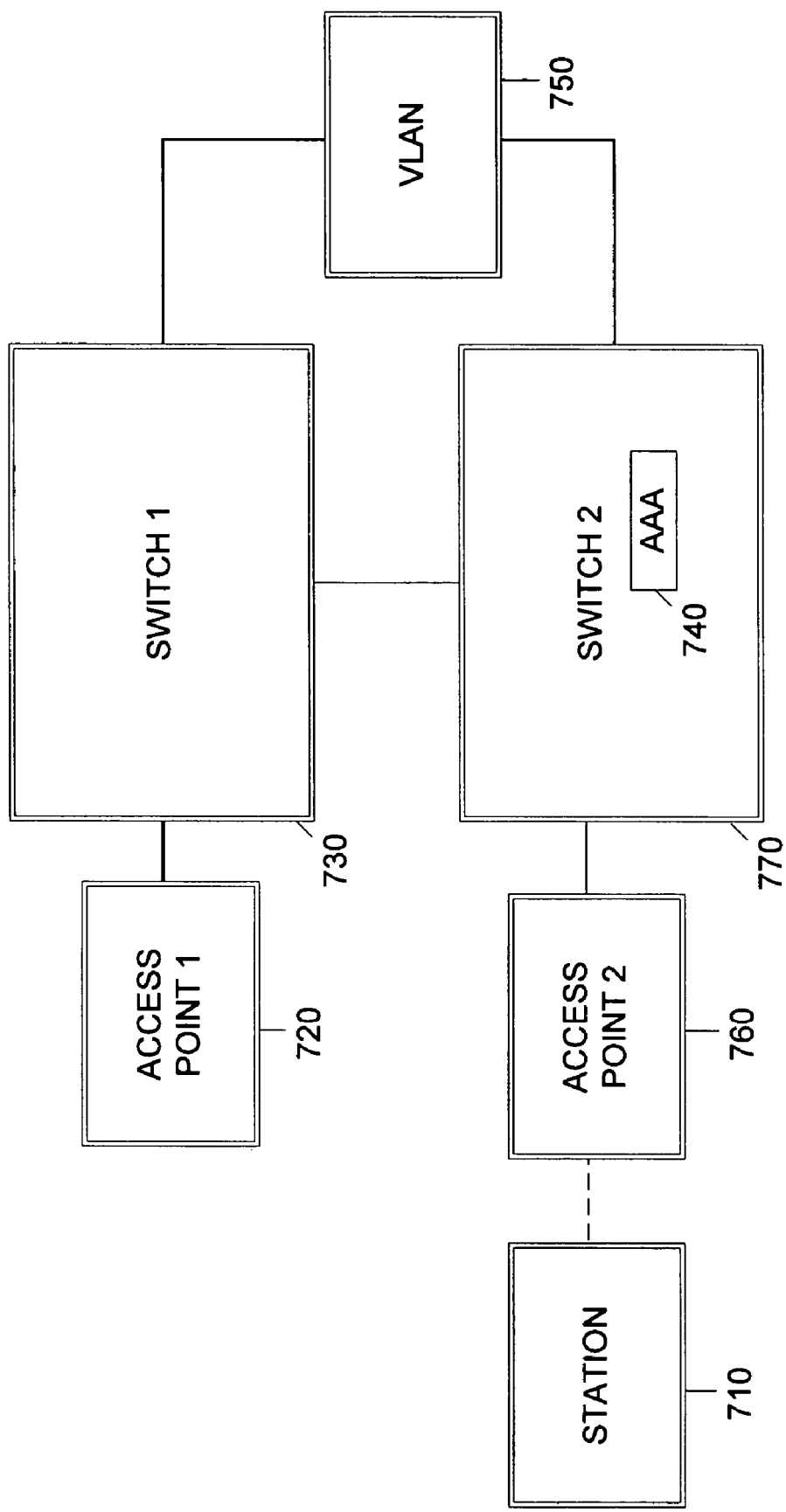

FIGS. 7A and 7B show an example of an embodiment with AAA transfer, but no VLAN tunneling.

In FIG. 7A, wireless station 710 has a wireless link with access point 710 attached to distribution system switch 1 730. The wireless station 710 has AAA state 740 at distribution system switch 1 730. The wireless station 710 is associated with VLAN 750, which is attached to distribution system switch 1 730.

In FIG. 7B, wireless station 710 roams to access point 2 760 attached to distribution system switch 2 770. Distribution system switch 2 770 recognizes that wireless station 710 is from an access point connected to distribution system switch 1 730. The AAA state 740 for wireless station 710 is transferred from distribution system switch 1 730. Because VLAN 750 is already connected to distribution system switch 2 770, no VLAN tunneling takes place.

In another embodiment, a wireless station has a wireless connection to a first access point connected to a first distribution system switch. While a user roams to a second access point connected to a second distribution system switch, packets arrive at the first access point, and are queued, for example on the first access point and/or the first distribution system switch. When a user finishes roaming to the second distribution system switch, packets are extracted from the queue, and inserted into the transmit queue for the user on the second access point attached to the second distribution system switch.

What is claimed is:

1. A wireless local area network method, comprising:
in response to a wireless station moving in a wireless local area network from a first wireless area of a first access point of the wireless local area network to a second wireless area of a second access point of the wireless local area network,
wherein the first access point is connected to a first distribution system switch of the wireless local area network and the second access point is connected to a second distribution system switch of the wireless local area network,
wherein the first distribution system switch and the second distribution system switch are at least part of an interconnected distribution system of the wireless local area network, and
wherein the wireless station corresponds to at least a first virtual local area network connected to at least the first distribution system switch,
tunneling the first virtual local area network to the second distribution system switch.

2. The method of claim 1, further comprising:
at least partly prior to the wireless station moving from the first wireless area of the first access point of the wireless local area network to the second wireless area of the second access point of the wireless local area network, communicating data of the first virtual local area network to the wireless station via the first distribution system switch.

3. The method of claim 2, further comprising:
at least partly prior to communicating data of the first virtual local area network to the wireless station via the first distribution system switch, creating AAA data corresponding to the wireless station.

4. The method of claim 3, further comprising:
storing the AAA data corresponding to the wireless station at the first distribution system switch.

5. The method of claim 1, wherein tunneling includes:
at least partly after the wireless station moving from the first wireless area of the first access point of the wireless local area network to the second wireless area of the second access point of the wireless local area network, communicating data of the first virtual local area network to the wireless station via the second distribution system switch.

6. The method of claim 1, further comprising:
transferring, to the second distribution system switch, AAA data corresponding to the wireless station.

7. The method of claim 1, wherein tunneling includes tunneling the first virtual local area network from the first distribution system switch.

8. The method of claim 1, wherein tunneling includes tunneling the first virtual local area network from a third distribution system switch of the wireless local area network, the third distribution system switch being at least part of the interconnected distribution system of the wireless local area network, the first virtual local area network connected to at least the third distribution system switch.

9. The method of claim 1, wherein tunneling includes layer 3 tunneling of layer 2 virtual local area network data.

10. The method of claim 1, wherein tunneling the first virtual local area network to the second distribution system switch occurs if the second distribution system switch is not connected to the first virtual local area network.

11. The method of claim 1, further comprising:
detecting the wireless station moving in the wireless local area network from the first wireless area of the first access point of the wireless local area network to the second wireless area of the second access point of the wireless local area network.

12. A wireless local area network method, comprising:
in response to a wireless station moving in a wireless local area network from a first wireless area of a first access point of the wireless local area network to a second wireless area of a second access point of the wireless local area network,
wherein the first access point is connected to a first distribution system switch of the wireless local area network and the second access point is connected to a second distribution system switch of the wireless local area network,
wherein the first distribution system switch and the second distribution system switch are at least part of an interconnected distribution system of the wireless local area network, and
wherein the wireless station corresponds to at least a first virtual local area network connected to at least the first distribution system switch and the second distribution system switch,
transferring AAA data corresponding to the wireless station to the second distribution system switch.

13. The method of claim 12, further comprising:
at least partly prior to the wireless station moving from the first wireless area of the first access point of the wireless local area network to the second wireless area of the second access point of the wireless local area network, communicating data of the first virtual local area network to the wireless station via the first distribution system switch.

14. The method of claim 13, further comprising:
at least partly prior to communicating data of the first virtual local area network to the wireless station via the first distribution system switch, creating AAA data corresponding to the wireless station.

15. The method of claim 14, further comprising:
storing the AAA data corresponding to the wireless station at the first distribution system switch.

16. The method of claim 12, further comprising:
at least partly after the wireless station moving from the first wireless area of the first access point of the wireless local area network to the second wireless area of the second access point of the wireless local area network, communicating data of the first virtual local area network to the wireless station via the second distribution system switch.

17. The method of claim 12, wherein communicating data of the first virtual local area network to the wireless station via the second distribution system switch occurs without communicating data of the first virtual local area network to the wireless station via the first distribution system switch.

18. The method of claim 12, further comprising:
detecting the wireless station moving in the wireless local area network from the first wireless area of the first access point of the wireless local area network to the second wireless area of the second access point of the wireless local area network.

19. A wireless local area network method, comprising:
in response to a wireless station attempting to communicate with a first virtual local area network via a first access point of the wireless local area network, wherein the first access point is connected to a first distribution system switch of the wireless local area network, recognizing that the first distribution system switch is not connected to the first virtual local area network;

recognizing that a second distribution system switch is connected to the first virtual local area network, wherein the first distribution system switch and the second distribution system switch are at least part of an interconnected distribution system of the wireless local area network; and tunneling the first virtual local area network from the second distribution system switch to the first distribution system switch.

20. The method of claim 19, further comprising:

communicating data of the tunneled first virtual local area network to the wireless station via the first distribution system switch.

21. The method of claim 19, further comprising:

in response to the wireless station attempting to communicate with the first virtual local area network via the first access point of the wireless local area network, creating AAA data corresponding to the wireless station.

22. The method of claim 21, further comprising:

communicating AAA data corresponding to the wireless station from the first distribution system switch to the second distribution system switch.

23. The method of claim 22, wherein communicating AAA data corresponding to the wireless station from the first distribution system switch to the second distribution system switch occurs prior to communicating data of the tunneled first virtual local area network to the wireless station via the first distribution system switch.

24. The method of claim 22, wherein communicating AAA data corresponding to the wireless station from the first distribution system switch to the second distribution system switch occurs prior to tunneling the first virtual local area network from the second distribution system switch to the first distribution system switch.

25. The method of claim 21, further comprising:

storing the AAA data corresponding to the wireless station at the first distribution system switch.

26. The method of claim 19, further comprising:

transferring, to the second distribution system switch, AAA data corresponding to the wireless station.

27. The method of claim 19, wherein tunneling includes layer 3 tunneling of layer 2 virtual local area network data.

28. The method of claim 19, further comprising:

detecting the wireless station attempting to communicate with the first virtual local area network via the first access point of the wireless local area network, wherein the first access point is connected to the first distribution system switch of the wireless local area network.

* * * * *